(No Model.)
F. M. MECUM.
GANG PLOW.
No. 459,524. Patented Sept. 15, 1891.
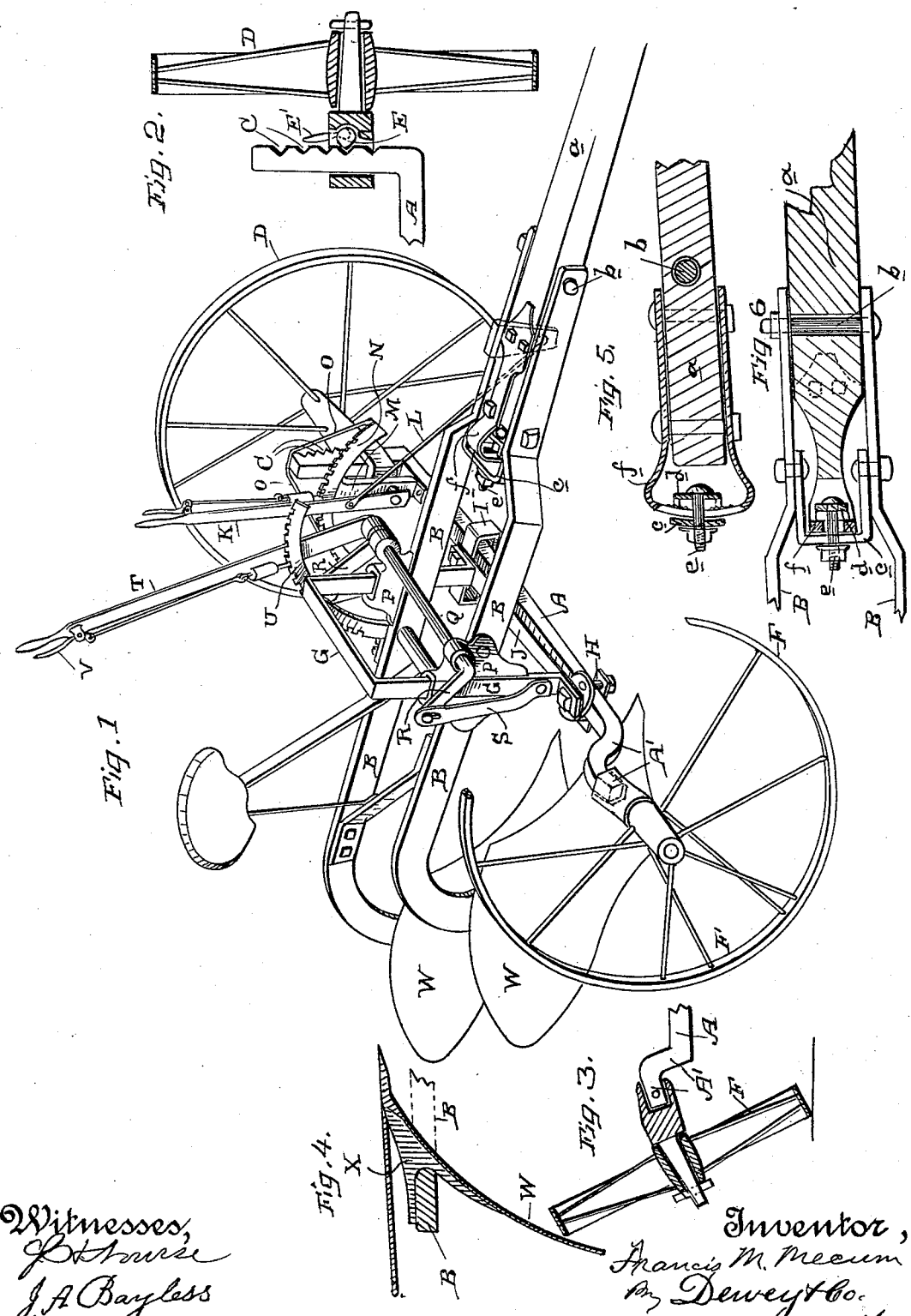
Witnesses
J. H. Howse
J. A. Bayless
Inventor,
Francis M. Mecum
By Dewey & Co.
Attys

UNITED STATES PATENT OFFICE.

FRANCIS MARION MECUM, OF CHICO, CALIFORNIA.

GANG-PLOW.

SPECIFICATION forming part of Letters Patent No. 459,524, dated September 15, 1891.

Application filed May 15, 1891. Serial No. 392,899. (No model.)

*To all whom it may concern:*

Be it known that I, FRANCIS MARION MECUM, a citizen of the United States, residing at Chico, Butte county, State of California, have invented an Improvement in Gang-Plows; and I hereby declare the following to be a full, clear, and exact description of the same.

My invention relates to certain improvements in sulky gang-plows.

It consists in certain details of construction, which will be more fully explained by reference to the accompanying drawings, in which—

Figure 1 is a perspective view of my plow. Fig. 2 is a section of the left wheel, showing its attachment to the end of the axle. Fig. 3 is a similar view of the right wheel and axle end. Fig. 4 is a horizontal section across the plow and standard, showing also the beam in dotted lines and the angle of the landside to it. Fig. 5 is a vertical and Fig. 6 is a horizontal section of the rear end of the pole and its adjusting attachment.

A is the axle, which extends across beneath the beams B B of the plow, and upon this axle the plow-beams are supported and adjusted. Upon the left side the axle is turned up at right angles, as shown, and one of its outer faces has transverse notches or grooves C made in it.

The wheel D turns loosely upon a spindle, the end of which, projecting inwardly, has a square opening or socket made vertically through it, so that it will fit and slide loosely upon the upturned end of the axle. Transversely across this opening and upon the side adjacent to the grooved or corrugated face of the upturned end of the axle is journaled a cam E, having a lever or handle E', by which it may be rotated. When rotated into one position, it will enter and lock with either of the transverse grooves, which may be opposite to it at that time, and thus the wheel-spindle is securely fixed to the axle at any desired point. When it is desired to change this position so that the axle may be raised or lowered with relation to the wheel, it is done by simply turning the lever and cam until the latter is free from the groove, when the upturned end of the axle may be slipped through the socket in the spindle end until the proper position is reached, when it is again locked by means of the cam, as before described. The opposite end of the axle A is bent upward, then outward, and downward at an angle, as shown at A'.

The right-hand wheel F is journaled to turn upon a spindle similar to the one shown upon the left, but the end of the spindle which is extended inwardly is bent so as to form an obtuse angle with the axis of the spindle. This end is of sufficient size to have a square socket made in it and extending inward from the end, and this socket fits exactly upon the end A' of the axle. When the spindle is turned so that this bent inner end corresponds with the end A' of the axle while the spindle itself stands horizontally, it will be manifest that the wheel F will turn in an approximately vertical plane; but when the spindle is removed from the end of the axle and reversed the wheel will then stand at a considerable angle, the bottom inclining inwardly toward the line of travel of the plows. The object of this is to allow this wheel to form a brace against the plows and prevent any tendency which the plows may have to run in toward the land, this wheel traveling against the solid portion of the ground next to the furrow which has previously been turned and just in front of the furrow which is being turned by the plow nearest to it.

The spindle-socket is held upon the end A' of the axle in any suitable manner, either by simple locking-pin or other device.

G is a rectangular yoke having its bottom ends turned outwardly to form angular feet, and the foot upon the right side is secured to a clip H by means of a bolt which passes down into the top of the clip or through the axle, if preferred, so as to form a pivot about which the axle may be moved horizontally. The foot at the left side of this yoke is secured to a rectangular slotted guide I, the slot being of sufficient diameter to allow the axle to pass through it and to be moved freely backward and forward within the slot. The two lower ends of the rectangular yoke G are also united by a plate J, so that they are perfectly rigid. The object of this construction is to allow the axle to be turned about the pivot-pin at the right, so that it may stand at an angle, either exactly at right angles with the line of travel of the plows, or at a little greater or less than a right angle, as may be desired. When the left-hand wheel is moved so that it stands back of a right angle, the tendency of the wheels will be to draw the plows inward toward the land, which, in the case of tough hard land where it is difficult to keep the plows to their work, is desirable. If, however, the plows have a tendency to run in too much, the position of the axle is changed so that the left-hand wheel stands a little forward of a line at right angles with the travel of the plow, when it will tend to run the plows away from the land, and this may be used either in conjunction with the right-hand wheel, when the latter is set at an angle, as previously described, or when that wheel is running in a vertical plane and parallel with the left-hand wheel.

In order to conveniently move the axle, I have shown a lever K fulcrumed to a brace-rod L, the front end of which is attached to the left timber of the plow-frame. The lower end of the lever is pivoted to an upright M, fixed to the axle A near the upturned portion B. Upon the upper end of this upright is fixed the curved rack N, the ends of this rack being braced by the curved brace-rod O, the central portion of which is secured to the upper end of the upturned portion B of the axle A. A pawl of any suitable or usual construction is adapted to engage the curved rack, and when the lever is thrown either forward or back it holds the axle in either of the positions previously described. This lever being within easy reach of the driver, the position of the axle with reference to the line of travel of the plows is easily changed at any time to suit the character of the soil being worked.

Upon each side of the beams B which carry the plows are fixed plates P, having vertical slots through which the vertical sides of the rectangular yoke pass, and this yoke serves as a guide upon which the plow-frame is raised or depressed.

A shaft Q is journaled across the frame timbers just in front of the yoke, and has crank-arms R extending rearwardly and connected by means of links S with the lower part of the yoke upon each side.

A long hand-lever T is secured to the outer end of the transverse shaft, and by means of this lever the shaft is turned, and the crank-arms moving in the ends of the links, which serve as fulcrums for these crank-arms, enable the operator to raise or depress the plow-frame moving upon the guiding-yoke, as before described.

A curved rack U is secured to the frame and a pawl engages the rack and holds the hand-lever at any point where desired. The pawl is released by the usual hand device V at a point convenient to the handle.

The plows W may be of any suitable or desired construction, and may be used either with or without landsides. The rear ends of the plow-beams are curved downwardly, as shown, so as to form standards, to which the plows are attached.

Inside the mold-boards and extending upwardly and along the inner edges of the mold-boards above the position of the landside are the flanged plates or frogs X, which are suitably secured to the mold-board and have their inner faces formed in a plane which is not exactly in line with the direction of travel of the machine or with the plane of the plow-beams. The angle is such that the points of the plows will be thrown farther inward than the heel and a little inside of the line of travel of the machine. This relieves the landside when the latter is used and prevents too great a friction against the solid land as the plow is drawn along over the field. The plow-beams extend transversely above the wheel-axle, having the plows secured to their rear ends, as shown. The beams are parallel and the front ends are bent or drawn together, so as to make a space between them of just sufficient width to receive the rear end of the draft-pole $a$. This space is of considerable length and the pole has a fulcrum-pin $b$ passing through it and the front ends of the plow-beams, the rear end of the pole extending some distance back between these beams, as shown. To the rear end of the pole is bolted a vertical yoke $f$, having the rear end curved on a radius of which the fulcrum-pin is the center. Between the plow-beams, just behind this yoke, is fixed another yoke or plate $c$, so that the yoke at the rear end of the tongue may move up and down just within the fixed plate.

$d$ is a clamping-plate, which may have teeth or serrations adapted to engage corresponding serrations within the yoke or plate. The vertical yoke upon the rear of the pole is slotted and the stationary plate upon the plow-beams has a hole through it, and a bolt $e$ passes through the slot and hole and also through a hole in the locking-plate $d$. This bolt has a head upon the inner end and a nut fitting screw-threads upon its rear outer end. By loosening this nut the rear end of the pole may be raised or depressed about the fulcrum-pin, thus correspondingly depressing or raising the front end of the plow-beam, and when adjusted satisfactorily the nut is turned so as to clamp the tongue in the desired position. By this construction I am enabled to set the plows so that they will enter the ground more readily, or reverse the setting so that the tendency will be to rise out of the ground, or it may be set to any intermediate point.

By fixing the tongue, as here shown, directly in the line of draft between the two plows I avoid all side draft, which would be caused by setting the pole to either one side or the other, and the plow thus draws and is more easily handled.

Having thus described my invention, what I claim as new, and desire to secure by Letters Patent, is—

1. In a gang-plow, the axle having the vertically-upturned end, a wheel-spindle adjustably upon the axle, and the locking-cam, as shown, the right end of the axle having an angular bend A', and the right wheel-spindle having the inner socketed end bent to an obtuse angle with the axis of the spindle and fitting upon the end A' of the axle, said socket being reversible, so that the wheel may rotate in a vertical plane or at an angle with such plane, substantially as herein described.

2. In a gang-plow, the axle having the vertically-upturned end, a wheel having a spindle adjustable thereon and means for detachably securing the spindle to the said upturned end of the axle, an angular bend at the opposite end of the axle and a wheel-spindle bent at an obtuse angle and having a socketed end adapted to engage said angular bend, a rectangular yoke from which the plow-beams are supported, a pivot or fulcrum pin by which the right end of the yoke is connected with the right end of the axle, a horizontal slotted guide through which the opposite portion of the axle passes, and mechanism whereby the axle may be moved in the slot, turning about its fulcrum-point, so that the movable end may be set forward or back of the line at right angles with the travel of the plow, substantially as herein described.

3. In a gang-plow, the axle, and bearing-wheels, a rectangular yoke having its lower ends supported upon the axle and its vertical sides serving as guides, plow-beams having vertically-slotted plates fitting said guides and traveling thereon, a crank-shaft fulcrumed to the plow-beams adjacent to the yoke, links connecting the ends of the cranks with the sides of the yoke, and a lever with holding rack and pawl, whereby the shaft may be rotated and the plow-beams raised or depressed upon the guide, substantially as herein described.

4. In a gang-plow, the plow-beams extending across the bearing-axle and adjustable thereon, the tongue fulcrumed between the front ends of the plow-beams directly in the line of draft of the plows, a vertical yoke fixed to the rear end of the tongue, a transverse yoke fixed to the plow-beams, within which the tongue-yoke has vertical motion, and a clamping-plate with locking-screw and nut, whereby the rear end of the tongue may be adjusted up and down with relation to the plow-beams and locked therein, substantially as herein described.

In witness whereof I have hereunto set my hand.

FRANCIS MARION MECUM.

Witnesses:
  Geo. F. Hawkins,
  William Hawkins.